United States Patent [19]

Bartlett et al.

[11] Patent Number: 4,721,023

[45] Date of Patent: Jan. 26, 1988

[54] SAW GUARD SYSTEM

[75] Inventors: Robert L. Bartlett, Dayton; John G. Legler, Huber Heights; Harold E. Folkerth, Dayton, all of Ohio

[73] Assignee: Shopsmith, Inc., Dayton, Ohio

[21] Appl. No.: 877,698

[22] Filed: Jun. 20, 1986

[51] Int. Cl.⁴ ............................................. B27B 5/26
[52] U.S. Cl. .................................... 83/100; 83/102.1; 83/477.1; 83/477.2; 83/478; 83/544
[58] Field of Search ................... 83/100, 102.1, 477.2, 83/478, 574, 477.1

[56] References Cited

U.S. PATENT DOCUMENTS

| 713,196 | 11/1902 | Bennett | 83/102.1 |
|---|---|---|---|
| 1,094,710 | 4/1914 | Flohr | 83/477.2 |
| 2,466,325 | 4/1949 | Ocenasek | 83/102.1 |
| 2,593,596 | 4/1952 | Olson | 83/102.1 |
| 2,615,479 | 10/1952 | Bearup | 83/477.2 X |
| 2,927,612 | 3/1960 | Edgemond, Jr. | |
| 3,043,353 | 7/1962 | Sherwen | |
| 4,063,478 | 12/1977 | Stuy | 83/100 |
| 4,255,995 | 3/1981 | Connor | 83/100 |
| 4,483,573 | 11/1984 | Keller | 83/477.2 X |

FOREIGN PATENT DOCUMENTS 2904685  8/1980  Fed. Rep. of Germany ..... 83/477.2

OTHER PUBLICATIONS

Newspaper Supplement Entitled "President's Be Prepared Sale," 1979.
Shopsmith Mark V Accessory Catalog, 1983, pp. 8-9.
"Upper Saw Guard/Splitter" instruction sheet, Shopsmith Item 505627, published 5/79.
"Sawdust Collector & Under Table Saw Guard", Shopsmith Item 505628, published 11/79.

Primary Examiner—Frank T. Yost
Attorney, Agent, or Firm—Biebel, French & Nauman

[57] ABSTRACT

A saw guard system adapted to be mounted on the headstock quill of a multipurpose woodworking tool includes a rear portion adapted to be clamped to the headstock quill, a front portion which forms a pocket with the rear portion and is adjustable so that the pocket size can be varied to accommodate rotary tools of varying thicknesses, and an exhaust port communicating with the pocket and having an outer end adapted to be attached to a vacuum hose. The rear portion supports a riving knife adapted to extend above an associated saw table and which includes an upper saw guard. The riving knife is positioned in a common plane with a rotary tool mounted on the quill, and is capable of remaining closely adjacent to the rotary tool regardless of table position or quill extension. An anti-kickback device includes a finger having a downwardly-extending point and is connected to the riving knife by a pair of link arms so that the horizontal orientation of the finger remains constant regardless of its elevation relative to the riving knife. To facilitate retention of dust in the pocket, as well as its removal through the port, the front portion includes a transverse channel at its lower end communicating with the port, the rear portion includes a deflector plate above the port, and the port is skewed relative to the front portion and is located at a downstream side of the pocket.

26 Claims, 13 Drawing Figures

SAW GUARD SYSTEM

BACKGROUND OF THE INVENTION

The present invention relates to saw guards and, more particularly, to saw guards for use with multipurpose woodworking tools having a table saw mode of operation.

Some multipurpose woodworking tools are of the type having a frame, a motor-driven headstock slidably mounted on the frame, and a plurality of accessories which are also mounted on the frame and are powered by the headstock. A common accessory with such multipurpose woodworking tools is the saw table which includes a table top having a central blade slot and a pivot attachment to a pair of legs. The legs are joined by a tie bar and adjustably mounted for vertical movement on a carriage slidably attached to the frame of the woodworking tool. A circular saw blade is mounted on a quill spindle which extends from the headstock, and the headstock and saw table are positioned such that the circular saw blade extends upwardly through the table slot. Standard table sawing operations may be performed on such a device.

An example of such a multipurpose woodworking tool is shown and described in the Edgemond, Jr. et al. U.S. Pat. No. 2,927,612. That multipurpose woodworking tool includes a quill spindle which is part of a quill assembly that can be advanced and retracted relative to the headstock so that the multipurpose tool can be modified to perform horizontal boring and vertical drill press operations. However, when modified to function as a table saw, the quill assembly can be adjusted to position the circular saw blade within the slot of the saw table.

In order to cover the exposed portions of the circular saw blade which protrude above and below the saw tables of such mulitpurpose woodworking tools, removable saw guards have been developed. These saw guards perform the dual function of shielding the circular saw blade and containing the sawdust and other debris generated during a table sawing operation. One type of saw guard commonly used includes a two-piece lower saw guard which covers the portion of the saw blade extending beneath the saw table, and an upper shield, preferably made of a transparent plastic material, which encloses the portion of the saw blade extending above the saw table.

The lower saw guard consists of a rear portion that attaches to the quill of the headstock and includes a spring-loaded slide that is urged upwardly against the underside of the saw table, and thereby provides a continuous enclosure regardless of the relative elevation of the saw table to the headstock. This portion of the lower saw guard encloses the rear and periphery of a saw blade attached to the quill. The front of the saw blade is enclosed by a tie bar shield which attaches to the tie bar of the saw table and includes an upper edge which extends toward the table slot. The rear portion of the lower saw guard includes a vacuum port shaped to receive the hose of a shop vacuum so that sawdust generated during operation and collecting within the lower saw guard is removed.

The upper shield pivotally attaches to a spreader or splitter, which is plate-shaped and adjustably positioned to lie in a common plane with the saw blade. The splitter attaches to a bracket attached to the side of the tie bar, and therefore moves relative to the saw blade as the table is raised or lowered.

Although this type of saw guard adequately shields a circular saw blade, there are some drawbacks with such a design. For exmaple, since the splitter is attached to the tie bar, it is necessary to position the quill of the headstock so that the saw blade is coplanar with the splitter when the multipurpose tool is modified to function as a table saw. Should the saw table be moved relative to the quill spindle for any reason, or the quill spindle moved relative to the saw table, it would be necessary to realign the blade with the splitter before using the table saw again.

Another disadvantage is that the pocket formed by the tie bar shield and rear portion of the lower saw guard is not adjustable so that the efficiency of the dust removal system varies with the type of tool mounted on the quill. That is, a saw guard designed for maximum efficiency when used in combination with a circular saw blade may not provide the same level of efficiency when a dado blade, or molder is used. Since the vacuum port of such a saw guard is connected to the rear portion of the lower saw guard, the ability of a vacuum cleaner to remove dust generated by a sanding wheel is reduced because the port is located behind the work surface of the sanding wheel. Furthermore, this lack of adjustability prevents some tools from being used with that type of saw guard. The sanding disk is one example.

The dust removable capability of such saw guards is also reduced by the bosses which support the spring-loaded slide. These bosses protrude into the pocket and create turbulence within the pocket during operation which reduces the efficiency of the saw guard in directing dust to the vacuum port.

A disadvantage with those saw guards that include splitter mounted on the saw table is that the saw guard is fixed relative to the elevation of the table and therefore is raised and lowered relative to the saw blade as the table height is adjusted. When the saw table is elevated, a large gap is formed between the splitter and saw blade which may tend to reduce the effectiveness of the splitter in preventing binding of the blade with the kerf and in preventing kickbacks.

Another common component of prior art saw guard assemblies is the anti-kickback device which prevents the spinning saw blade from throwing a workpiece back toward the user. One form of anti-kickback device includes a pair of pawls pivotally attached at their upper ends to the splitter, and having teeth formed in their lower ends. The pawls are spring biased to pivot downwardly, and ideally the pawl is angled rearwardly when it engages a workpiece so that a maximum number of teeth contact a workpiece passing beneath it. In such a position, a workpiece is permitted to slide relative to the pawls in a downstream or feeding direction, but will be held by the pawls against the table if urged in an upstream direction by the saw blade.

A disadvantage with this type of anti-kickback device is that its effectiveness is dependent upon its angular orientation relative to the workpiece; maximum effectiveness is achieved in a relatively narrow range of angles in which a maximum number of pawl teeth contact the workpiece. Since this angular orientation is determined by the distance from the pivot connection of the pawl with the splitter to the upper surface of the workpiece, the effectiveness of the pawl is dependent upon the thickness of the workpiece and the height of the splitter above the table.

Accordingly, there is a need for a saw guard which is designed to be used in combination with a multipurpose woodworking tool that is sufficiently adjustable to function efficiently when used with a variety of rotary tools, such as circular saw blades, sanding wheels, dado blades and the like. Furthermore, there is a need for a saw guard which can remain fixed relative to a rotary tool even though the quill spindle and saw table are adjusted relative to the multipurpose tool frame. There is also a need for a saw guard in which the splitter remains coplanar and closely adjacent to the saw blade regardless of the relative elevation of the saw table, and includes an antikickback device that is highly effective regardless of the workpiece thickness or table orientation.

SUMMARY OF THE INVENTION

The present invention is a saw guard assembly for a multipurpose woodworking tool which is sufficiently adjustable to enclose and contain the dust generated by a variety of woodworking tools and which includes a riving knife that is maintained at a constant, close proximity to a circular saw blade regardless of the relative elevation of the saw table. The saw guard includes a lower guard housing having a rear portion which attaches to the quill of a multipurpose tool headstock, and a front portion adjustably attached to the rear portion and including a vacuum cleaner port.

The riving knife is removably clamped to the rear portion and extend upwardly above the surface of an associated saw table. The riving knife is adapted to support an upper guard which is shaped to enclose the portion of the saw blade which protrudes above the surface of the saw table.

The saw guard assembly also includes an anti-kickback device which includes a finger having a downwardly-extending point for engaging a workpiece. The finger is connected to the riving knife by a pair of link arms so that it is capable of vertical movement relative to the riving knife without changing its horizontal orientation. Consequently, the finger is maintained at an orientation providing maximum effectiveness for engaging a workpiece thrown back by the saw blade regardless of the thickness of the workpiece or the elevation of the saw table relative to the riving knife.

In order to enclose the space beneath the associated saw table completely, the rear portion includes a spring-loaded slide which is urged upwardly against the underside of the saw table forming a continuous wall with the rear portion regardless of the relative elevation of the saw table. The slide is positioned within the pocket and the bosse supporting the slide are outside, adjacent to the headstock. This arrangement provides a smooth surface within the pocket to minimize turbulence and increase efficiency of dust removal.

The front portion includes a tie bar shield which attaches to the tie bar of the saw table and encloses the space between the upper surface of the front portion and the underside of the saw table. Since it is attached to the saw table, the tie bar shield moves with the table but overlaps the front portion sufficiently to form a continuous wall with the front portion regardless of the relative elevation of the saw table.

The pocket made by the engagement between the front and rear portions of the lower guard is adjustable in thickness so that the front and rear portions may be spaced a distance appropriate for the particular rotary tool mounted on the quill. For example, the front and rear portions may be spaced relatively close together for a thin circular saw blade, or spaced further apart for a thicker dado blade or sanding wheel. Thus, the volume defined by the front and rear portions may be held at a minimum to increase the efficiency of a vacuum cleaner in removing dust from the saw guard through the port. By extending the opening to its widest position, blades and other accessories can be changed without having to remove the guard.

Several components in the design of the lower guard work together to maximize the ability of the lower guard to retain dust below the saw table and expel it through the port. For example, the front portion includes a transverse channel at its lower end communicating with the port. The port is located at a downstream side of the pocket, and is skewed outwardly from the front portion. This provides a passage for dust to the port when the front portion is positioned adjacent to the rotary tool in the pocket; the skewed position of the port eliminates the need for dust flowing through the channel to turn a sharp corner to exit the port. The lower housing also includes a deflector plate, located above the port, to prevent dust from being carried by the rotating tool past the port and out of the pocket.

Because the riving knife is attached to the rear portion, which is in turn mounted on the quill, the riving knife may be positioned to be coplanar with a circular saw blade by adjusting the position of the rear portion relative to the quill. Once this alignment has been effected, the riving knife will remain coplanar and closely proximate to the circular saw blade regardless of the relative elevation of the associated saw table, and regardless of whether the quill spindle is advanced or retracted relative to the saw table, such as would occur when the saw blade is being positioned within the saw table slot.

Accordingly, it is an object of the present invention to provide a saw guard assembly which can be attached to or removed from a multipurpose woodworking tool easily; a saw guard assembly having a lower guard housing forming a pocket which is adjustable in thickness to accommodate rotary tools having varying thicknesses and thereby minimize the volume enclosing the tool; a saw guard having a riving knife which is maintained in close proximity to and coplanar with an associated circular saw blade regardless of the relative elevation of an associated saw table; a saw guard assembly which efficiently retains and expels the dust generated during woodworking operations; and a saw guard assembly having an anti-kickback device for securely engaging a workpiece regardless of the thickness of a workpiece or the elevation of the saw table relative to the riving knife.

Other objects and advantaages of the invention will become apparent from the following description, the accompanying drawings and the appended claims.

DETAILED DESCRIPTION OF THE PREFERRED EMBODIMENT

Figure 1:
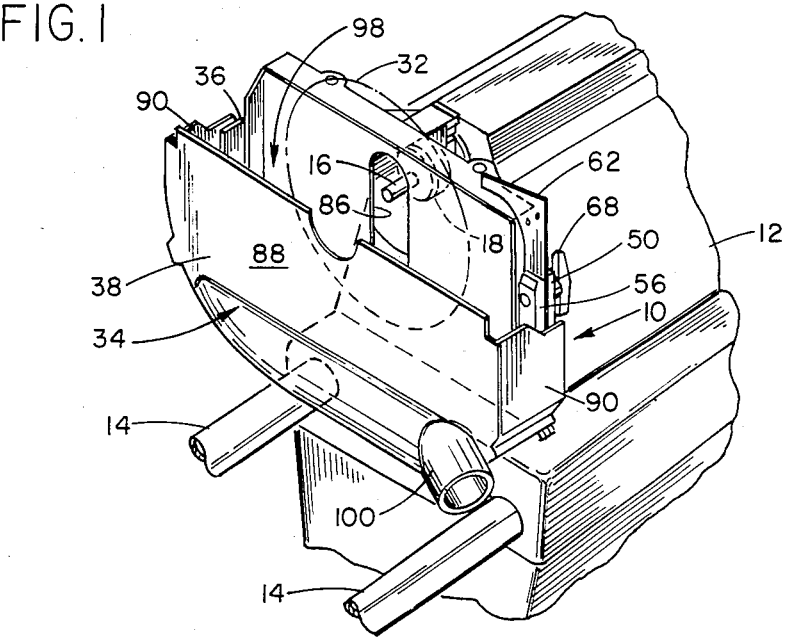
FIG. 1 is a perpsective view of the lower portion of a preferred embodiment of the saw guard assembly mounted on the headstock of a multipurpose woodworking tool.
Figure 2:
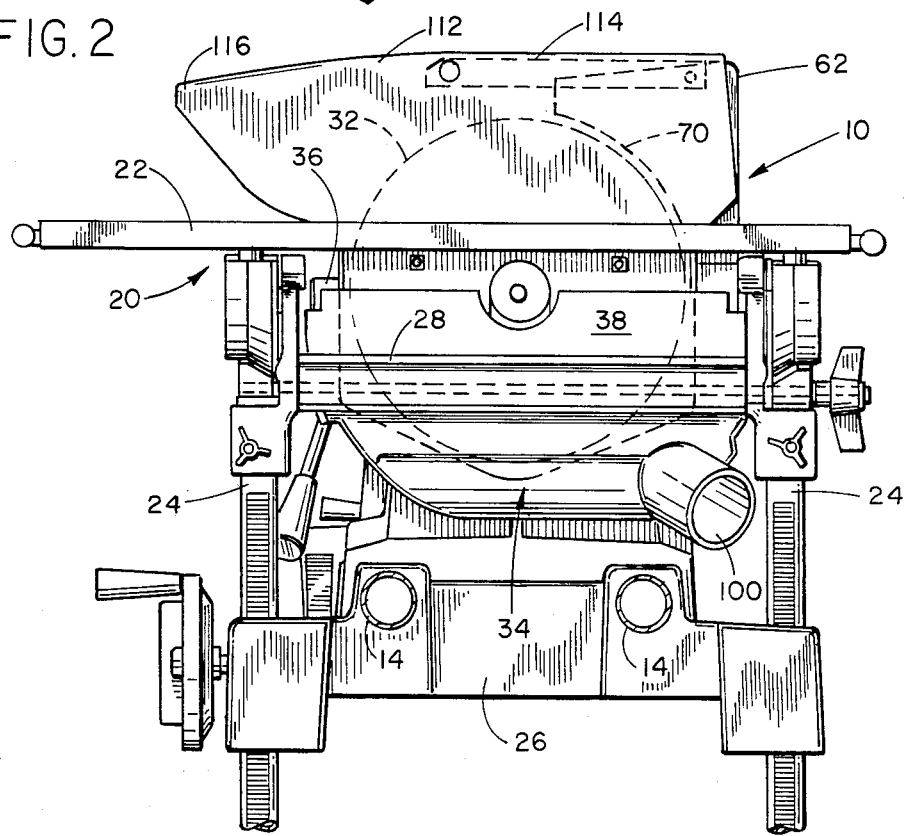
FIG. 2 is an end elevation of the saw guard assembly of FIG. 1 mounted on an associated multipurpose woodworking tool.
Figure 3:
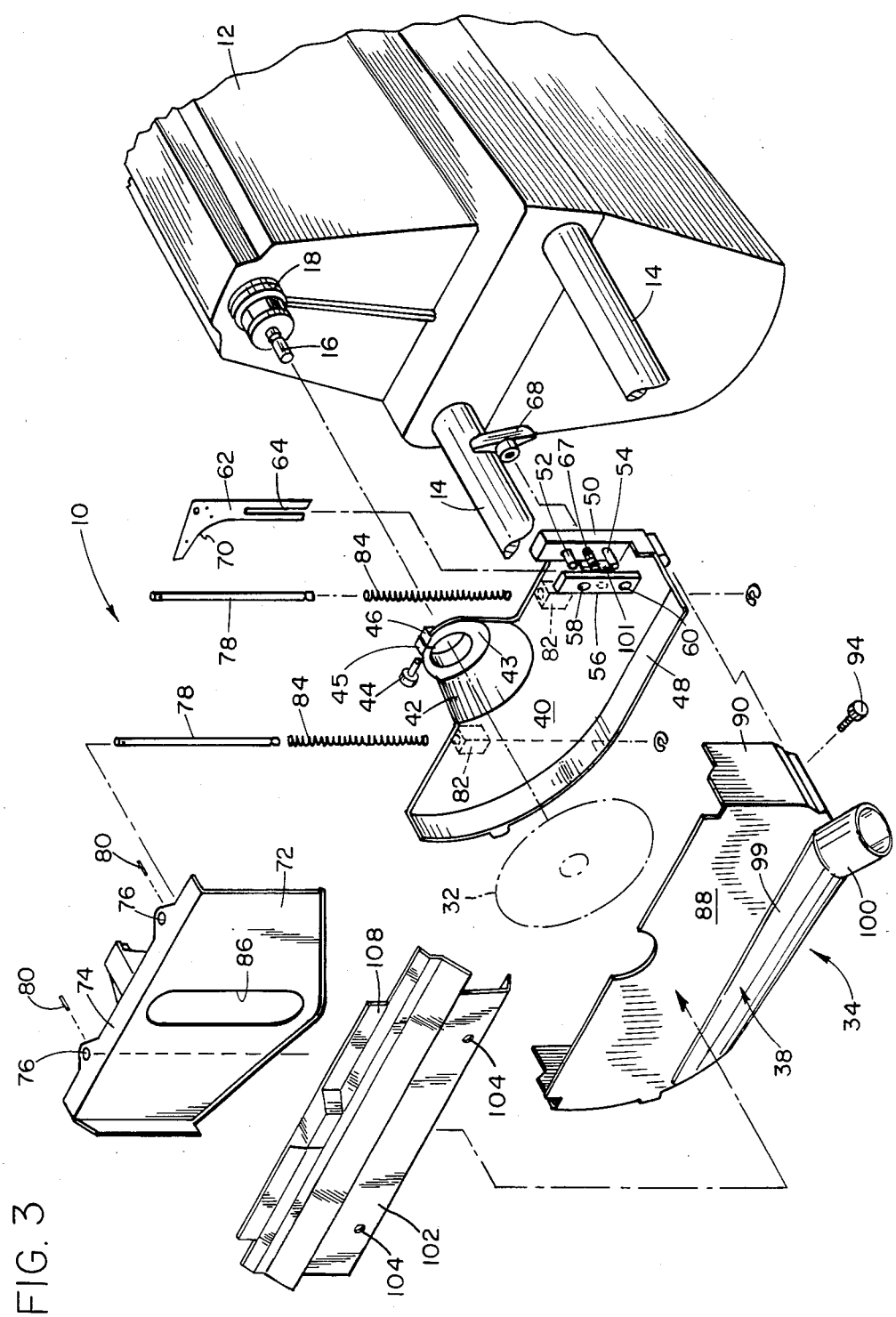
FIG. 3 is an exploded view in perspective of the portion of the saw guard assembly shown in FIG. 1.

As shown in FIGS. 1, 2 and 3, the present invention is a saw guard assembly, generally designated 10, part of which is adapted to be mounted on the headstock 12 of a multipurpose woodworking tool. Such a multipurpose woodworking tool is shown, for example, in the Edgemond, Jr. et al. U.S. Pat. No. 2,927,612, the disclosure of which is incorporated herein by reference. The headstock 12 is mounted on way tubes 14 of a frame (not shown) and includes a motor-driven quill spindle 16 supported by a quill 18 that is capable of being advanced outwardly or withdrawn into the headstock.

Figure 6:
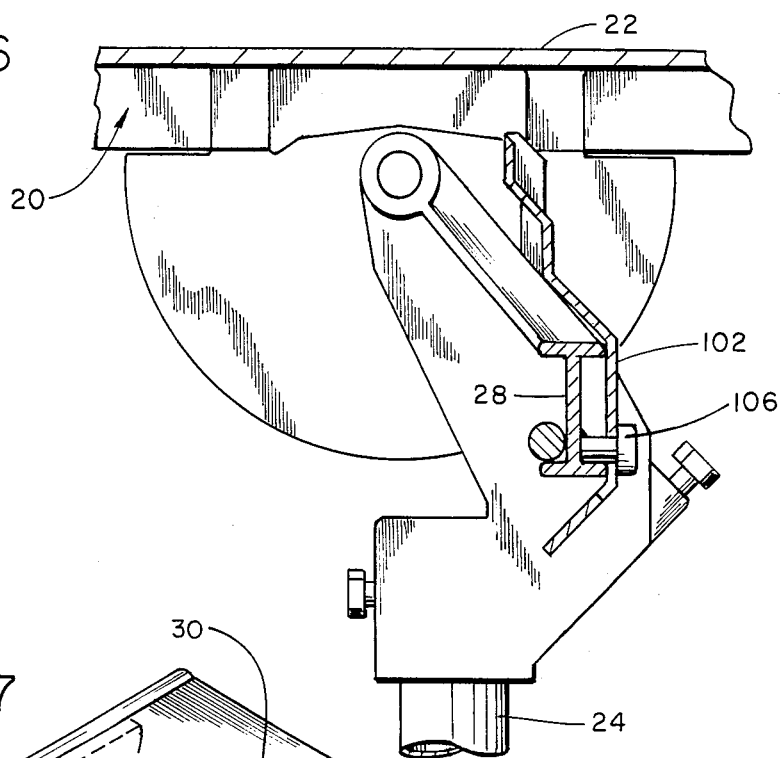
FIG. 6 is a detail side elevation in section of the saw guard assembly of FIG. 1 showing the tie bar shield mounted on a tie bar.
Figure 7:
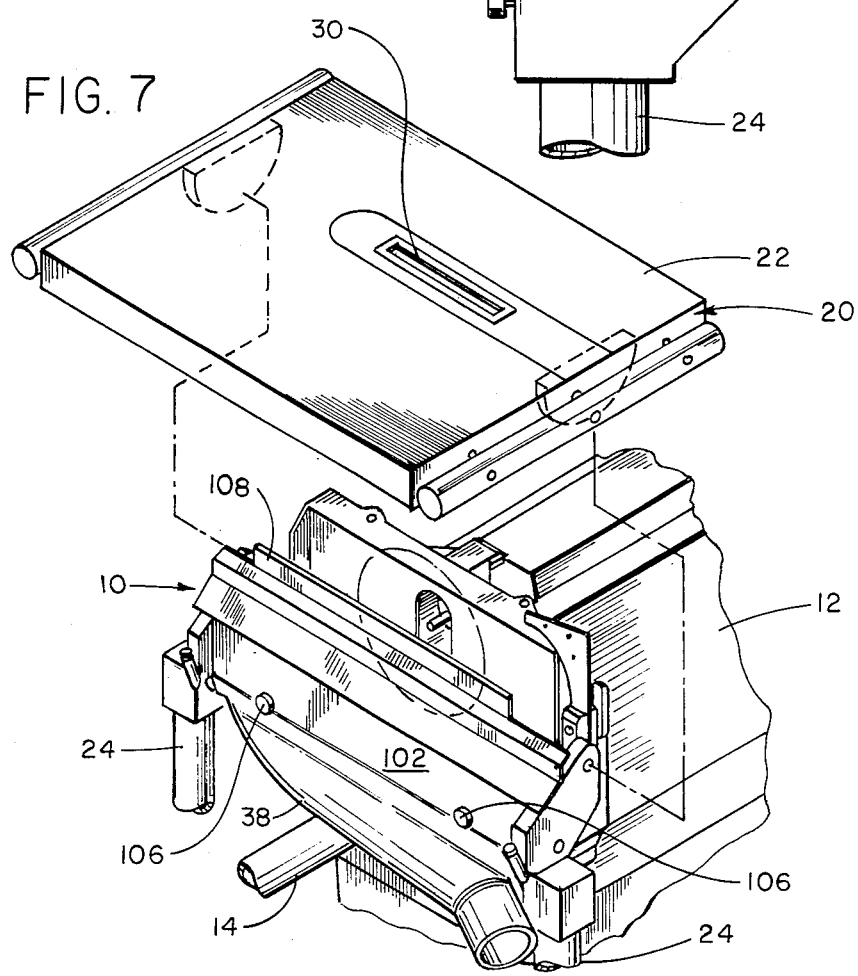
FIG. 7 is a perspective view showing the saw guard of FIG. 1 mounted on a multipurpose woodworking tool in which the saw table is exploded therefrom.

As shown in FIGS. 2 and 7, the multipurpose woodworking tool also includes a saw table 20 having a tabletop 22 which is pivotally attached to a pair of legs 24. Legs 24 are vertically adjustably mounted on a base 26 which is slidably attached to the way tubes 14. The legs 24 are joined by a tie bar 28 (see also FIG. 6) which includes the pivot connection with the tabletop 22. The tabletop 22 includes a transverse slot 30 which is located so that a rotary tool 32, mounted on the quill spindle 16, may protrude through it.

As shown in FIG. 3, the saw guard assembly 10 includes a lower guard 34 having a rear portion 36 and a front portion 38. The rear portion 36 has a rear face 40 which includes a conical section 42 that terminates in a split ring 43. The split ring 43 is shaped to fit over the quill 18 and includes a tightening cap screw 44 through the ends 45, 46 of the ring. Cap screw 44 is threaded into end 46 so that a tightening of the screw draws ends 45, 46 together. When the split ring 43 is clamped to the quill 18 by the cap screw 44, the rear face is oriented substantially perpendicularly to the rotational axis of the quill spindle 16.

Figure 8:
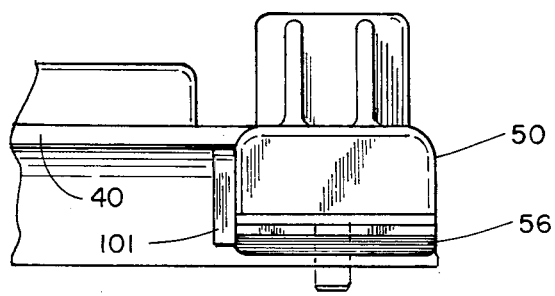
FIG. 8 is a detail top view of the rear portion of the lower guard.
Figure 9:
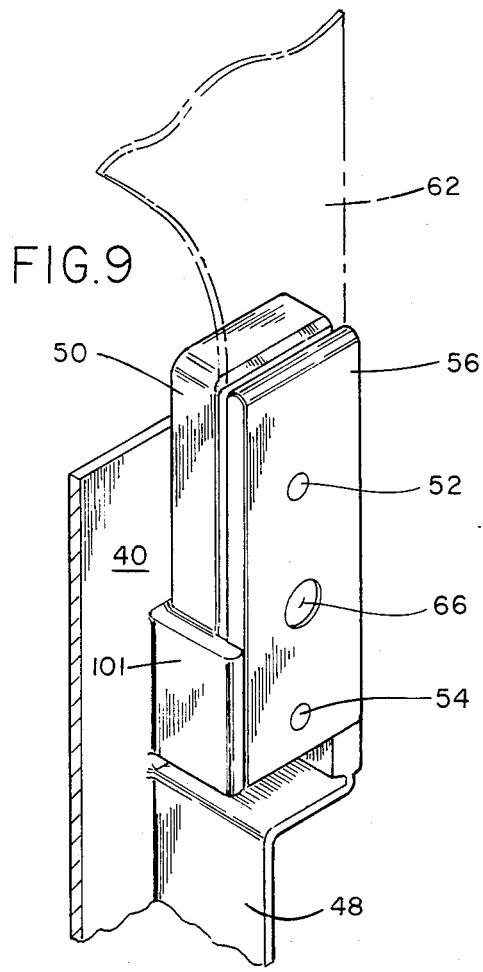
FIG. 9 is a detail in perspective of the rear portion of the lower guard, in which the riving knife is shown in phantom.

The rear plate 36 includes a ridge 48 which extends about the lower periphery of the rear face 40. As shown in FIGS. 3, 8 and 9, a side wall of the rear face 40 includes a clamp block 50 having forwardly protuding pins 52, 54, and a clamp plate 56 with holes 58, 60. The clamp blcok 50 and clamp plate 56 are shaped to clamp the lower portion of a riving knife 62 having a slot 64 formed therealong. A bolt 66 is attached to and extends from plate 56 through a hole 67, of the plate, and through slot 64 of the riving knife. The bolt 66 is threaded into a thumb screw 68 so that tightening of the thumb screw causes the bolt to clamp the clamp plate against the riving knife 62 and hold it against the clamp block 50.

The slot 64 is sizes so that its upper end rests upon the upper pin 52 of the clamp block 50. As shown in FIGS. 2 and 7, the slot 30 in the tabletop 22 is sized and positoned so that the riving knife 62 may pass through it and extend above the tabletop. The riving knife 62 includes an arcuate portion 70 which is shaped to conform to the curvature of the outer periphery of the rotary tool 32 mounted on the quill spindle 16.

Figure 4:
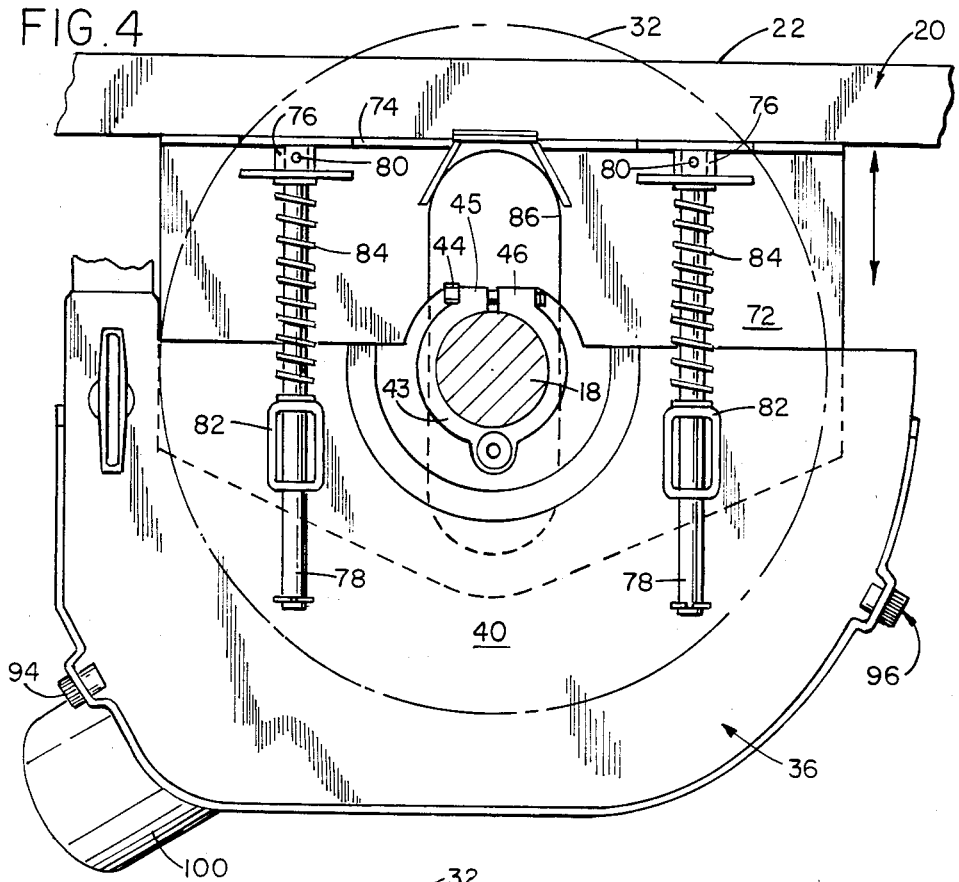
FIG. 4 is a detail end elevation of the saw guard assembly of FIG. 1.
Figure 5:
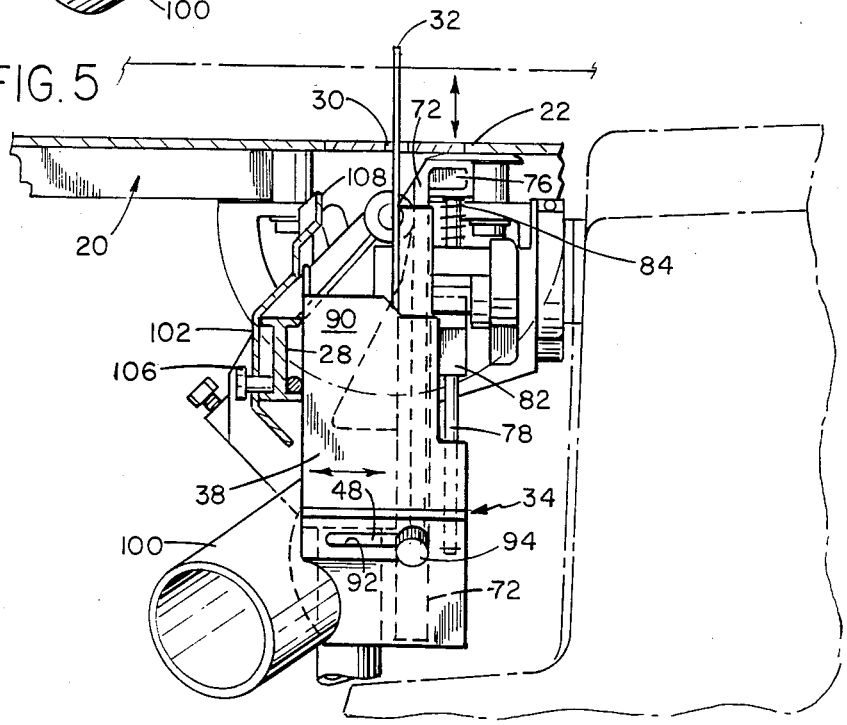
FIG. 5 is a detail side elevation of the saw guard assembly of FIG. 1.

As best shown in FIGS. 3, 4 and 5, the rear portion 36 includes a slide 72 which is plate-shaped and positioned between the rear and front portions 36, 38. The slide 72 includes an upper, rearwardly-extending flange 74 having bosses 76 within which the upper ends of rods 78 are secured by pins 80. The rods 78 extend through bosses 82 formed on the rear side of the rear face 40. Helical extension springs 84 extend between the bosses 76 and the bosses 82 so that the slide 72 is biased upwardly from the rear face 40 against the underside of the tabletop 22.

This provides a substantially continuous rear wall regardless of the relative elevation of the tabletop 22 to the quill 18 on which the rear portion 36 is mounted. The slide 72 includes an elongate opening 86 which is in registry with the opening formed by the split ring 43 and shaped to receive the quill 18 therethrough with sufficient clearance to prevent contact therebetween. It should be noted that, because the rods 78 and bosses 82 are located on the rear side of the rear face 40, the front side of the rear face, which is adjacent to the tool 32, is smooth, flat and uninterrupted by surface obstructions which might cause turbulence which would impair the dust collecting capability of the lower guard 34.

As shown in FIGS. 1, 2, 3 and 5, the front portion 38 includes a front face 88 and a side wall 90 which extends about the lower periphery of the front portion and rearwardly toward the rear portion 36. The side wall 90 has a contour which is similar to the contour formed by the ridge 48 and clamp block 50 of the rear portion 36 and is shaped to telescope over them. The side wall 90 includes a slot 92 (FIG. 5) and a cap screw 94 extends through the slot and is threaded into a lower portion of the ridge 48. A similar slot and cap screw combination is located at 96 on an opposite side of lower saw guard 34 (FIG. 4).

Thus, the telescopic engagement of the front plate 38 with the rear portion 36 forms a pocket 98 (FIG. 1) which extends about the lower portion of the rotary tool 32 mounted on the quill spindle 16, and can be adjusted in thickness so that the front face 88 and rear face 40 of the front and rear plates can be positioned relatively close to the tool. In this way, the volume of the pocket 98 can be maintained at a minimum to maximuze the efficiency of an attached dust removal system.

The front face 88 includes a transverse channel 99 (FIGS. 1, 2 and 3), which is concave facing the pocket 98, and terminates in a cylindrical port 100, which is shaped to receive the end of a hose of a shop vacuum system (not shown). The channel 99 and port 100 are located at the lower end of the front face 88, so that they extend across the outer periphery of a rotary tool 32, such as a circular saw blade or a disk sanding wheel. The port 100 is generally cylindrical in shape and is skewed relative to the front face 88. The port 10 is located to a side of the front portion 38 which is downstream of the rotary tool 32 in the pocket 98; that is, the side traversed by a point on a rotating tool just prior to its rotating upwardly from the pocket (e.g., in FIG. 2, the right-hand side for a tool 32 rotating counterclockwise).

By positioning the channel 99 and port 100 in the manner previously described, the efficiency of the lower guard in retaining dust and conveying it through the port is enhanced. This is especially true for rotary tools such as disk sanders which generate a larger amount of dust in the front of the pocket 98. To optimize the dust retention and removal capability of the lower guard 34, the rear portion 36 includes a substantially flat deflector plate 101 which is attached to the clamp block 50 above the outlet 100, and is oriented substantially vertically (FIGS. 3, 8 and 9). The deflector plate 101 helps prevent dust from flowing with the rotating tool 32 upwardly past the port 100 and out of the lower guard 34.

In order to provide a continuous front wall extending below the saw table 20, the front portion 38 includes a shield 102, best shown in FIGS. 3, 5, 6 and 7. The shield 102 includes slots 104 through which screws 106 extend to be threaded into holes formed in the tie bar 28 of the saw table 20. The upper portion 108 of the shield extends rearwardly of the tie bar and front face 88 of the front portion 38 so that it does not interfere with the pivotal movement of the tabletop 20 relative to the legs 24 and support structure including tie bar 28.

The saw guard 10 includes an upper guard, generally designated 100, which is shaped to fit over the portion of the tool 32 which protrudes above the tabletop 22 of the saw table 20. The upper guard 110 includes an upper shield 112, preferably made of a shock-resistant, transparent plastic. The shield 112 is attached to the riving knife 62 by a link 114 which is pivotally connected at its ends to the shield and knife. The shield 112 has a nose 116 with an inclined lower surface so that a workpiece which is fed along the tabletop 22 into the tool 32 urges the front portion of the shield upwardly from the tabletop. The link 114 enables the shield 112 to move in this fashion, and it enables the shield to move upwardly and downwardly as the tabletop 22 is raised or lowered to vary the depth of a cut by the rotary tool 32.

The saw guard system 10 is attached to a multi-purpose woodworking tool and adjusted as follows. Prior to attaching the saw guard, the base 26 of the saw table 20 is moved along the ways 14 so that it is spaced from the headstock 12 sufficiently to expose the quill spindle 16 and quill 18. The rear portion 36 of the lower guard 34 is attached to the quill 18 by inserting the quill through the split ring 43 and tightening the cap screw 44.

The specific rotary tool 32 to be used should be mounted on the quill spindle 16 at this time. It should be noted that the saw guard 10 functions effectively with all forms of circular saw blades, dado blades, sanding wheels and the like. If a circular saw blade is selected to be mounted on the quill spindle 16, the split ring 43 is positioned on the quill 18 such that the riving knife 62 lies in a common plane with the saw blade, then the cap screw 44 is tightened down on the split ring. As a result, the riving knife 62 will be coplanar with and spaced closely adjacent to the saw blade 32 at all times during the operation of the table saw, regardless of the relative elevation of the tabletop 22 and regardless of the position of the saw blade within the table slot 30.

This is important since by closely positioning the riving knife to the blade circumference, the likelihood of a kickback occurring is greatly reduced, especially when compared to prior art devices employing splitters which were attached to the saw table.

After the rear portion 36 has been attached to the quill 18, the width of the pocket 98 is adjusted by sliding the front portion 38 toward or away from the rear portion 36, then tightening the screws 94 and 96 into the ridge 48 of the rear portion to clamp the front portion to the rear portion. For example, the thickness of the pocket 98, and consequently its volume, would be relatively low for use with a relatively thin rotary saw blade. However, the thickness of the pocket 98 preferably would be greater for use with a dado blade or a molding cutter.

After the lower guard 34 has been mounted on the quill 18 of the headstock 12, and the selected rotary tool mounted on the quill spindle 16, the base 26 of the saw table 20 is positioned adjacent the headstock 12. The tabletop 22 may be elevated prior to use so that it clears the lower saw guard 34 and riving knife 62 prior to use, then lowered until the splitter and saw blade 32 protrude a predetermined distance above the tabletop 22. In the alternative, this procedure is performed before attaching the riving knife 62 to the rear portion 36 so that the knife and accompanying upper shield may be attached to the saw guard after the table is in place. This would require merely that the lower portion of the riving knife 62 be inserted downwardly through the table slot 30 and between the clamp block 50 and clamp plate 56 to be clamped to the rear portion 36.

It should be noted that the slide 72 automatically moves upwardly into a position in which its upper surface abuts the underside of the table top 22. At this time, the tie bar shield 102 may be attached to the tie bar 28 to close the front portion of the lower guard 34. Finally, the port 100 is connected to the hose (not shown) of a shop vacuum or the like to provide a dust removal function.

Figure 10:
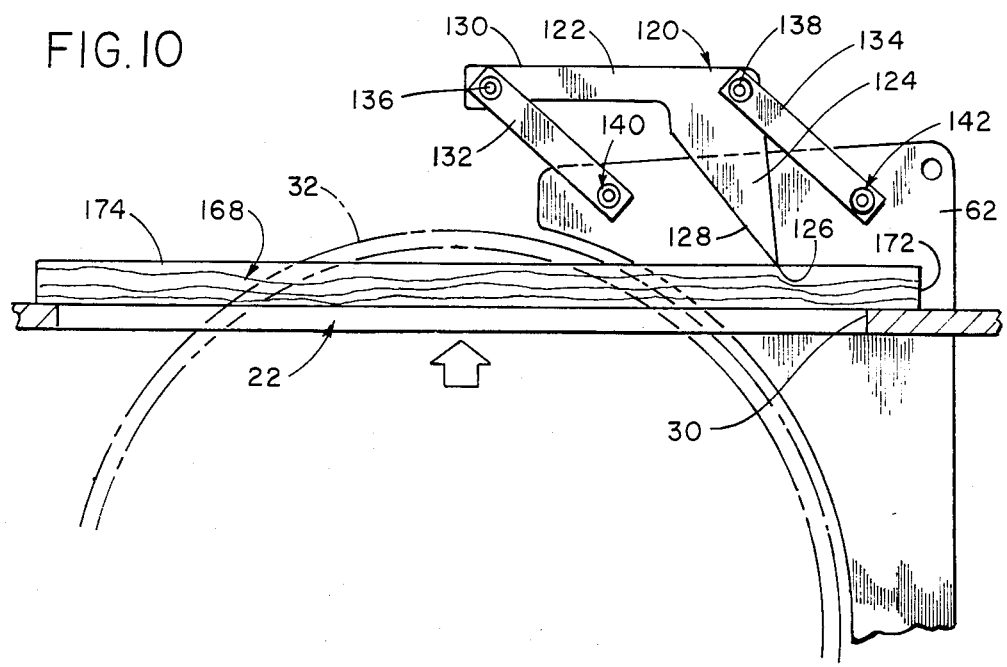
FIG. 10 is a detail side elevation of the saw guard system of FIG. 2 showing an anti-kickback device attached to the riving knife, and in which the upper shield has been removed.

As shown in FIG. 10, the preferred embodiment of the saw guard 10 includes an anti-kickback device, generally designated 120. The anti-kickback device includes a finger 122 having a downwardly extending portion 124 that terminates in a point 126. The downwardly extending portion 124 is positioned rearwardly of the finger 122 and includes a downwardly and rearwardly inclined leading surface 128. The body 130 of the finger is generally elongate in shape and, together with the downwardly extending portion 124, preferably is stamped from a single piece of sheet metal.

The finger 122 is connected to the upper portion of the riving knife 62 by first and second link arms 132, 134, respectively. First link arm 132 is pivotally attached to the front of the finger body 130 by a rivet 136 and second link arm 134 is attached to the rear portion of the body by rivet 138.

The anti-kickback device 120 of the preferred embodiment preferably includes two fingers 122, positioned on either side of the riving knife 62, and two pairs of link arms 132, 134, each pair pivotally attaching one of the fingers to the riving knife. Since the construction of the fingers 122 and link arms 132, 134 for each is the same, FIGS. 10, 12 and 13 will show only a single finger and pair of link arms for purposes of clarity.

However, the pairs of link arms 132, 134 are pivotally connected to the riving knife by common forward and rearward connections 140, 142, respectively. Connections 140, 142 are identical in structure, and therefore connection 140 shall be explained and illustrated in Fig. 11, with the understanding that it applies equally to connection 142.

Figure 11:
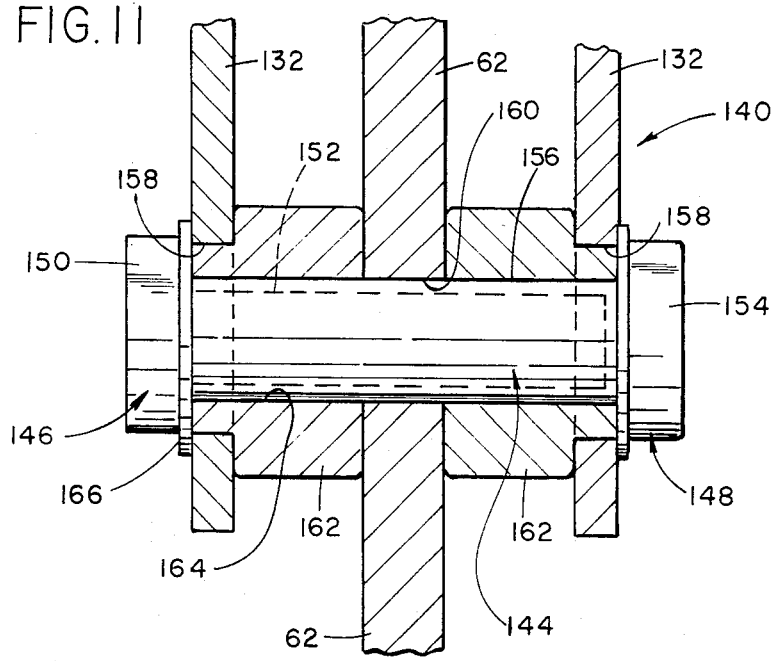
FIG. 11 is a detail plan view in section of the anti-kickback device of claim 10, showing the connection to the riving knife.

As shown in FIG. 11, connection 140 includes a central two-piece rivet assembly, generally designated 144, which consists of male portion 146 and female portion 148. Male portion 146 includes a head 150 and a tubular body 152. Female portion 148 includes a head 154 and a tubular body 156 sized to receive the tubular body 152 of the male portion in an interference fit.

The tubular bodies 152, 156 of the rivet assembly 144 extend through holes 158 of the link arms 132 positioned on either side of the riving knife 62 and through an aperture 160 in the riving knife. Annular spacers 162 are positioned between the riving knife 62 and the link arms 132 and include bores 164 which receive the rivet assembly 144 therethrough. Washers 166 are positioned on the outboard sides of the link arms 132 and are adjacent to the heads 150, 154 of the rivet assembly 144.

Figure 12:
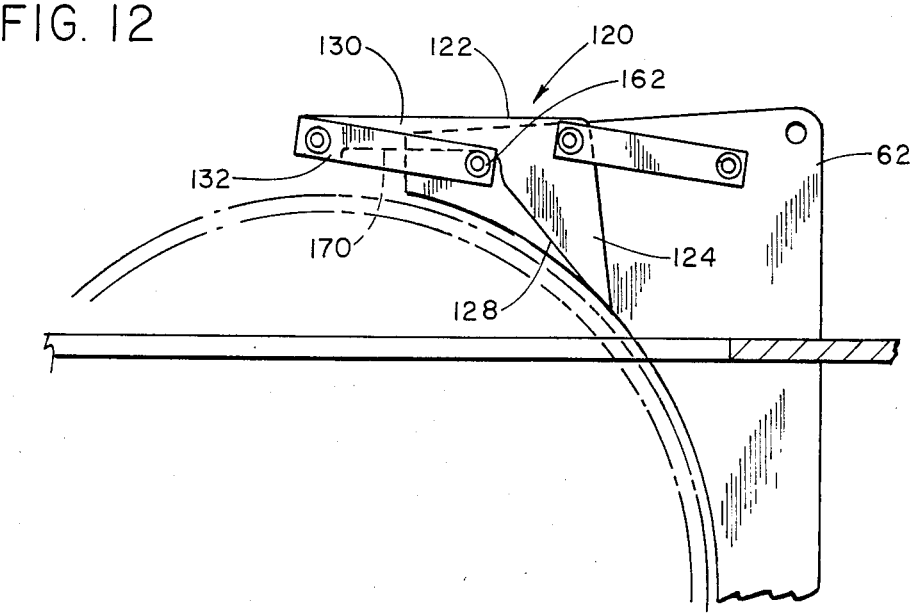
FIG. 12 is a detail side elevation of the saw guard system of FIG. 10 in which the anti-kickback finger is supported by a stop.

As shown in FIGS. 10 and 12, the finger 122 of the anti-kickback device 120 is connected to the link arms 132, 134 at their inboard sides so that the finger is positioned between the link arms and the riving knife 62. The finger 122 is positioned so that the link arms 132, 134 extend downwardly and rearwardly from it to the riving knife 62. Consequently forces exerted by a kicked-back workpiece on the downwardly-extending portion 124 in an upstream direction would cause the finger to pivot counterclockwise (FIG. 10) and downwardly into the workpiece to hold it against the tabletop 22. Preferably, portion 124 is sized to extend below connection 142 at all times to prevent the finger 122 from inadvertently pivoting clockwise to a position where the link arms 132, 134 extend downwardly and forwardly from the body 130. Such clockwise movement is prevented by contact between portion 124 and spacer 162 of connection 142.

As a result of the double link arm connection between the finger 122 and the riving knife 62, the finger is capable of vertical movement relative to the riving knife without a corresponding change in its horizontal orientation. Accordingly, the orientation of the downwardly extending portion 124 and point 126 remains constant regardless of the elevation of the finger 122 relative to the riving knife 62, so that it remains at the optimum orientation for engaging a workpiece 168 (FIG. 10).

As shown in FIG. 12, the spacers 162 comprising a part of the forward connection 140 also act as a stop which limits the downward movement of the finger 122. Since the finger 122 is positioned between the link arm 132 and riving knife 62 so that sufficient downward movement of the body 130 results in the lower edge 170 of the body contacting the spacer 162 positioned immediately below it. Thus, the spacer 162 defines the range of downwardly movement of the finger 122.

The operation of the anti-kickback device 120 is as follows. When feeding a relatively thin workpiece 168 across the tabletop 22, the leading edge 172 of the workpiece first contacts the leading surface 128 of the downwardly extending portion 124 and causes the finger 122 to be pivoted upwardly about the connections 140, 142.

Continued feeding of the workpiece 168 causes the workpiece to slide beneath the point 126 and past the riving knife 62 as the workpiece is cut by the blade 32. During this time, the point rests upon the upper surface 174 of the workpiece 168.

After the workpiece 168 has passed beneath the anti-kickback device 120, the fingers 122 pivots downwardly under its own weight to rest upon the spacer 162 (FIG. 11), and the anti-kickback device assumes the configuration shown in FIG. 12. Should the tabletop 22 be elevated relative to the riving knife as shown in FIG. 10, the point 126 of the downwardly extending portion 124 will enter the table slot and not contact the tabletop 22 so that the point will not be dulled by inadvertent contact against the metal surface of the tabletop.

Figure 13:
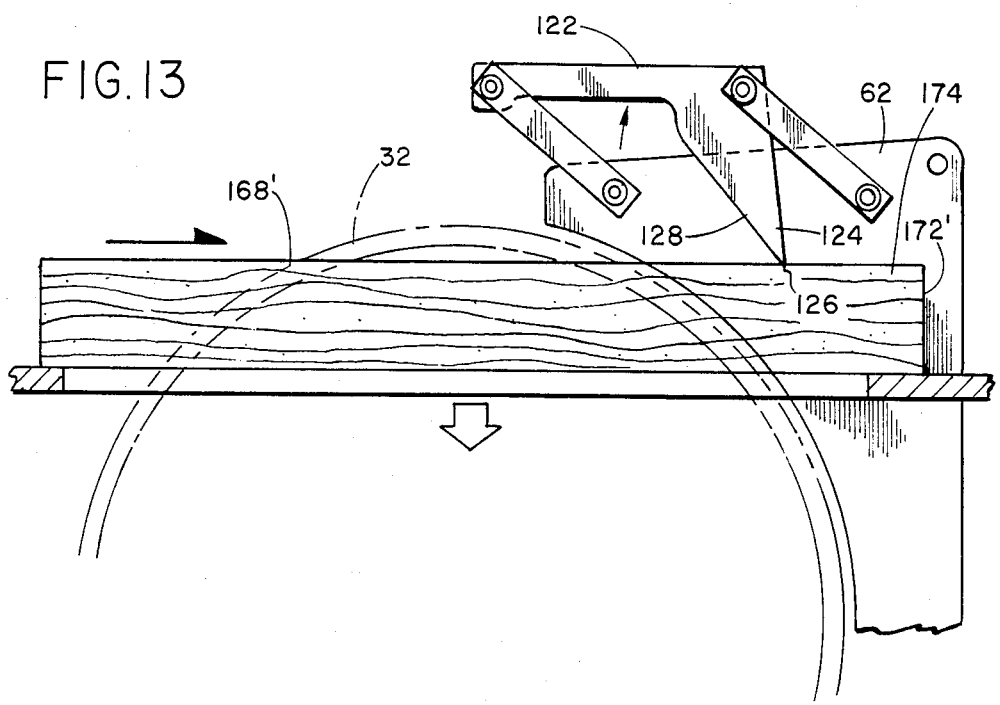
FIG. 13 is a detail side elevation of the saw guard system of FIG. 10 in which the anti-kickback finger is engaging a relatively thick workpiece.

As shown in FIG. 13, the feeding of a relatively thick workpiece 168' causes the finger 122 to pivot upwardly as the leading edge 172' contacts the leading surface 128. As the workpiece 168' passes by the riving knife 62, the point 126 rests on the upper surface 174' of the workpiece 168'.

As shown in FIGS. 10 and 13, the horizontal orientation of the finger 122 remains constant regardless of its elevation relative to the riving knife 62 which is determined by the thickness of the workpiece 168 passing beneath it. The angular orientation of the downwardly extending portion 124 therefore remains constant and fixed at an optimal angle to ensure that the point 126 engages the workpiece should it be thrown back by the rotating blade 32.

The advantages of the constant horizontal orientation of the finger 122 apply as well when the tabletop 22 is raised or lowered relative to the riving knife 62, which would have the same effect of varying the elevation of the finger relative to the riving knife as would substituting a thicker or thinner workpiece 168. Accordingly, the anti-kickback device 120 accommodates variations in table elevation as well as variations in the thickness of workpeices, and maintains optimal effectiveness.

Once attached to a multipurpose woodworking tool in the manner previously described, the saw guard 10 substantially encloses the portion of a rotary tool which extends below the saw table, and covers virtually the entire portion of the tool extending above the saw table in those instances when the upper shield 112 may be used, such as in performing a circular sawing operation. Both the upper and lower portions of the saw guard enclose the rotary tool regardless of the relative elevation of the saw table to the quill spindle 16 and tool 32 mounted on it.

In addition, the quill 18 may be advanced or retracted relative to the table 20 and headstock 12 in order to position the tool properly relative to the table slot 30. There is no need to reposition the riving knife 62 after performing this step, since the lower guard 34, including the riving knife, moves with the quill and tool so that the knife remains coplanar with the tool. The anti-kickback device 120, which is attached to the riving knife, remains at a constant and optimal orientation relative to the workpiece, regardless of the size of the workpiece or elevation of the tabletop.

While the form of apparatus herein described constitutes a preferred embodiment of the invention, it is to be understood that the invention is not limited to this precise form of apparatus, and that changed may be made therein without departing from the scope of the invention.

What is claimed is:

1. For use with a multipurpose woodworking tool of the type having a motorized headstock with a quill spindle for mounting circular saw blades and the like thereon, a quill supporting said spindle and protruding ouwardly from said headstock, and a saw table having a support frame and a tabletop pivotally mounted thereon, the tabletop having an elongated blade slot therethrough, a saw guard system comprising:

a rear portion having a rear face sized to cover a lower portion of a circular tool and means for attaching said rear portion to a headstock quill;

a front portion having a front face sized to cover a lower portion of a circular tool;

means for adjustably attaching said rear portion to said front portion to form a pocket therebetwen having an upwardly opening mouth such that said front face is displaceable toward and away from said rear face, whereby said pocket and said mouth may be varied in width to accommodate rotary tools of varying thicknesses therein and provide a minimum clearance between said portions and a rotary tool in said pocket during use; and port means communicating at an inner end thereof with said pocket and having an outer end adapted to be attached to vacuum hose means.

2. The saw guard system of claim 1 further comprising upper guard means attached to and extending upwardly from said rear portion sufficiently to enclose an upper portion of a rotary tool within said pocket, whereby said upper guard means remains fixed relative to a rotary tool mounted on an associated spindle.

3. The saw guard system of claim 2 further comprising a side wall attached to and coextensive with a lower periphery of said front face and extending rearwardly therefrom to engage said rear portion.

4. The saw guard system of claim 3 wherein said rear portion includes ridge means extending about a lower periphery of said rear face and shaped to telescope within said side wall; and said attaching means includes said side wall having a slot formed therethrough, and screw means threaded into said rear portion through said slot and sized such that said screw means may be tightened to clamp said front plate to said rear plate.

5. The saw guard system of claim 4 wherein said rear portion includes clamp means for engaging said upper guard means; and said upper guard means includes a riving knife adapted to engage said clamp means, and an upper shield pivotally attached to said riving knife, whereby said riving knife may be positioned closely adjacent to and remain fixed in position relative to a tool mounted on an associated quill spindle such that the potential for kickback is minimized.

6. For use with a multipurpose woodworking tool of the type having a motorized headstock with a quill spindle for mounting circular tools and the like thereon, a reciprocatable quill supporting said spindle and protruding outwardly from said headstock, and a saw table having a support frame and a table top pivotally mounted thereon, the table top having an elongated blade slot for receiving a portion of a circular tool therethrough, a saw guard system comprising:

a rear portion having a rear face sized to cover a lower portion of a circular tool and means for attaching said rear portion to a headstock quill;

clamp means attached to said rear portion and adapted to support a riving knife;

a riving knife attached to said clamp means and extending upwardly from said rear portion, said clamp means being positioned on said rear portion such that said riving knife is substantially coplanar with a circular tool mounted on an attached quill so that said riving knife may remain closely adjacent to and fixed relative to an associated circular tool as an attached reciprocatable quill is displaced longitudinally, thereby minimizing the potential for kickback;

a front portion having a front face sized to cover a lower portion of a circular tool and attached to said rear portion to form a pocket therewith;

anti-kickback means attached to said riving knife, said anti-kickback means including finger means and first and second link arms pivotally attached to forward and reaward ends of said finger means, respectively, and forward and rearward portions of said riving knife, respectively, whereby said finger means may pivot upwardly and downwardly relative to said riving knife while maintaining a substantially constant horizontal orientation; and said first link arm including stop means extending sidwardly therefrom such that said body may be pivoted downwardly to contact said stop means, whereby said stop means provides a lower limit of travel for said body.

7. The saw guard system of claim 6 wherein said finger means includes an elongate body having a downwardly-extending portion terminating in a point, said downwardly-extending portion having a downwardly and rearwardly-inclined leading edge.

8. The saw guard system of claim 6 wherein said first and second link arms are connected to said riving knife by rivet means including spacer means for spacing said link arms from said riving knife, said spacer means comprising said stop means.

9. The saw guard system of claim 8 wherein said body is positioned between said riving knife and said link arms, superposed to said spacer means.

10. The saw guard system of claim 9 wherein said link arms extend downwardly and rearwardly from said body to said riving knife.

11. For use with a multipurpose woodworking tool of the type having a motorized headstock with a quill spindle for mounting circular tools and the like thereon, a reciprocatable quill supporting said spindle and protruding outwardly from said headstock, and a saw table having a support frame and a table top pivotally mounted thereon, the table top having an elongated blade slot for receiving a portion of a circular tool therethrough, a saw guard system comprising:

a rear portion having a rear face sized to cover a lower portion of a circular tool and means for attaching said rear portion to a headstock quill;

clamp means attached to said rear portion and adapted to support a riving knife;

a riving knife attached to said clamp means and extending upwardly from said rear portion, said clamp means being positioned on said rear portion such that said riving knife is substantially coplanar with a circular tool mounted on an attached quill so that said riving knife may remain closely adjacent to and fixed relative to an associated circular tool as an attached reciprocatable quill is displaced longitudinally, thereby minimizing the potential for kickback;

a front portion having a front face sized to cover a lower portion of a circular tool and attached to said rear portion to form a pocket therewith;

means for adjustably attaching said rear portion to said front portion to permit said front face to be displaced toward or away from said rear face such that said pocket may be varied in width to facilitate tool changing, accommodate rotary tools of varying thicknesses, and provide a minimum of clearance between said guard and a rotary tool in said pocket during use; and channel means formed in said front portion and extending across a lower end thereof and port means communicating at an inner end thereof with said channel means and being located at a downstream side of said front portion for conveying debris from said pocket, said port means having an outer end adapted to be attached to vacuum hose means.

12. The saw guard system of claim 11 further comprising deflector plate means extending across said pocket and being positioned above said port means, such that debris in said pocket is prevented from flowing upwardly from said pocket and is deflected toward said port means.

13. The saw guard system of claim 12 wherein said rear portion includes ridge means extending about a lower periphery of said rear face; said front plate includes a side wall extending rearwardly from a lower periphery thereof and shaped to telescope over said ridge means; and said adjustable attaching means includes said side wall having a slot formed therethrough, and screw means threaded into said rear portion through said slot and sized such that said screw means may be tightened to clamp said front portion to said rear portion.

14. The saw guard system of claim 11 further comprising anti-kickback means attached to said riving knife, said anti-kickback means including first and second link arms pivotally attached to forward and rearward ends of said riving knife, bolt means including spacer means for connecting said link arms to said riving knife and spacing said link arms from said riving knife finger means including an elongate body having a rear portion extending downwardly and terminating in a point, said rear portion having a downwardly and rearwardly inclined leading edge, and said finger means being pivotally attached at forward and reaward ends therof to said first and second link arms, respectively, such that said link arms extend downwardly and rearwardly from said finger means to said riving knife, said finger means being positioned between said riving knife and said link arms and superposed to said spacer means such that said body may pivot upwardly or downwardly relative to said riving knife while maintaining a substantially constant horizontal orientation, said spacer means being positioned to operate as a stop to limit downwardly movement of said body.

15. A combination riving knife and antikickback device comprising:

a riving knife adapted to be mounted on a table saw and extend upwardly from a saw table thereof; finger means; and first and second link arms pivotally attached to forward and rearward ends of said finger means, respectively, and forward and rearward portions of said riving knife, respectively, whereby said finger means may pivot upwardly and downwardly relative to said riving knife while maintaining a constant horizontal orientation; and said finger means including an elongate body having a downwardly-extending portion terminating in a point, said downwardly-extending portion having a downwardly and rearwardly inclined leading edge.

16. The saw guard system of claim 15 wherein said first link arm includes stop means extending sidewardly therefrom such that said body may be pivoted downwardly to contact said stop means, whereby said stop means provides a lower limit of travel for said body.

17. The combination of claim 16 wherein said first and second link arms are connected to said riving knife by bolt means including spacer means for spacing said link arms from said riving knife, said spacer means comprising said stop means.

18. The saw guard system of claim 17 wherein said body is positioned between said riving knife and said link arms, superposed to said spacer means.

19. The combination of claim 15 wherein said link arms extend downwardly and rearwardly from said finger means to said riving knife.

20. For use with a multipurpose woodworking tool of the type having a motorized headstock with a quill spindle for mounting circular saw blades and the like thereon, a quill supporting said spindle and protruding outwardly from said headstock, and a saw table having a support frame and a tabletop pivotally mounted hereon, the tabletop having an elongated blade slot therethrough, a saw guard system comprising:

a rear portion having a rear face sized to cover a lower portion of a circular tool and means for attachment to a headstock quill;

a front portion having a front face sized to cover a lower portion of a circular tool, port means adapted to be attached to a vacuum hose, and a transverse channel communicating with said port means; and means for adjustably attaching said rear portion to said front portion to form a pocket therebetween communicating with said transverse channel and said port means and to permit said front face to be displaced toward or away from said rear face, whereby said pocket may be varied in width to accommodate rotary tools of varying thicknesses therein and provide a minimum clearance between said portions and a rotary tool in said pocket during use.

21. The saw guard system of claim 20 further comprising deflector plate means extending across said pocket above said port means.

22. The saw guard system of claim 20 wherein said channel extends across a lower end of said front face, and said port is positioned at said lower end and at a downstream side of said front portion.

23. For use with a multipurpose woodworking tool of the type having a motorized headstock with a quill spindle for mounting circular saw blades and the like thereon, a quill supporting said spindle and protruding outwardly from said headstock, and a saw table having a support frame and a tabletop pivotally mounted thereon, the table-top having an elongated blade slot therethrough, a saw guard system comprising:

a rear portion having means for attachment to a headstock quill, and a rear face sized to cover a lower portion of a circular tool;

a front portion having a front face sized to cover a lower portion of a circular tool;

means for adjustably attaching said rear portion to said front portion to form a pocket therebetween and to permit said front face to be displaced toward or away from said rear face, whereby said pocket may be varied in width to accommodate rotary tools of varying thicknesses therein and provide a minimum clearance between said portions and a rotary tool in said pocket during use;

port means communicating at an inner end thereof with said pocket and having an outer end adapted to be attached to vacuum hose means;

upper guard means attached to and extending upwardly from said rear portion sufficiently to enclose an upper portion of a rotary tool within said pocket, wherein said upper guard means remains fixed relative to a rotary tool mounted on an associated spindle;

said rear portion including ridge means extending about a lower periphery of said rear face and shaped to telescope within said side wall;

said attaching means including said side wall having a slot formed therethrough, and screw means threaded into said rear portion through said slot and sized such that said screw means may be tightened to clamp said front plate to said rear plate;

said rear portion including clamp means for engaging said upper guard means;

said upper guard means including a riving knife adapted to engage said clamp means, and an upper shield pivotally attached to said riving knife, whereby said riving knife may be positioned closely adjacent to and remain fixed in position relative to a tool mounted on an associated quill spindle such that potential for kickback is minimized; and shield means adapted to be attached to a front portion of a tie bar of an associated support frame, and shaped to overlap an upper portion of said front face of said front portion.

24. The saw guard system of claim 23 further comprising slide plate means slidably attached to said rear portion and including resilient means for urging against said rear portion and said slide plate to displace said slide plate upwardly from said rear portion against an underside of an associated saw table.

25. A combination riving knife and anti-kickback device comprising:

a riving knife adapted to be mounted on a table saw and extend upwardly from a saw table thereof;

first and second link arms pivotally attached to forward and rearward ends of said riving knife;

bolt means including spacer means for connecting said link arms to said riving knife and spacing said lnk arms from said riving knife;

finger meansincluding an elongate body having a rear portion extending downwardly and terminating in a point, said rear portion having a downwardly and rearwardly inclined leading edge; and said finger means being pivotally attached at forward and rearward ends thereof to said first and second link arms, respectively, and being positioned between said riving knife and said link arms and superposed to said spacer means such that said body may pivot upwardly or downwardly relative to said riving knife, while maintaining a substantially constant horizontal orientation, said spacer means being positioned to operate as a stop to limit downward movement of said body.

26. For use with a multipurpose woodworking tool of the type having a headstock with a motor-driven quill spindle for mounting circular saw blades and the like thereon, a quill supporting said spindle and protruding outwardly from said headstock, and a saw table having a support frame and tabletop pivotally mounted thereon, the tabletop having an elongated blade slot therethrough, a saw guard system comprising:

a rear portion having means for rigidly attaching to a headstock quill, a rear face oriented substantially perpendicularly to an attached quill and sized to cover a lower portion of a circular tool, said rear face having a substantially smooth and flat front side uninterrupted by surface obstructions;

ridge means extending about a lower periphery of said rear face and extending forwardly therefrom;

a front portion having a front face oriented substantially parallel to said rear face and sized to cover a lower portion of a circular tool;

a side wall attached to and coextensive with a lower periphery of said front face and extending rearwardly therefrom to said rear portio, said side wall being shaped to telescope over said ridge means such that said front and rear portions form a pocket shaped to receive a lower portion of a rotary tool therein;

means for adjustably attaching said side wall to said ridge means including slot means formed in said side wall and screw means extending through said slot means and threaded into said ridge means such that tightening of said screw means clamps said side wall against said ridge means, whereby a width of said pocket may be varied to provide a minimum clearance about a rotary tool therein;

channel means extending transversely across a lower end of said front portion and being concave in shape, opening to said pocket;

port means communicating at an inner end thereof with said channel means and being located at a downstream side of said front portion, said port means having an outer end adapted to be connected to vacuum cleaner means;

deflector .plate means positioned above said port means;

clamp means including a base integral with said rear portion, a clamp bar adjacent to said base, and screw means for attaching said clamp bar to said base;

a riving knife having a lower portion with a slot therealong sized to recieve said screw means therein, said lower portion being shaped to be clamped between said clamp bar and base, and an upper portion extending upwardly from said rear portion and including an arcuate portion located thereon to be adjacent to an associated circular tool;

slide means slidably attached to said rear portion and sized to extend across a width of said rear face, said slide means including means biasing said slide means upwardly from said rear portion;

an upper shield pivotally attached to said upper portion of said riving knife above an associated saw table; and shield means adapted to be attached to a front portion of a tie bar of an associated support frame such that said shield means overlaps an upper portion of said front portion, whereby said pocket is substantially enclosed by said front and rear portions, said slide means and said upper shield, regardless of an orientation of an associated saw table.

* * * * *